United States Patent
Jaradi et al.

(10) Patent No.: US 10,144,387 B1
(45) Date of Patent: Dec. 4, 2018

(54) SEATBELT WEBBING GUIDE

(71) Applicant: Ford Global Technologies, LLC, Dearborn, MI (US)

(72) Inventors: Dean M. Jaradi, Macomb, MI (US); S. M. Iskander Farooq, Novi, MI (US); Mohammad Omar Faruque, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/730,808

(22) Filed: Oct. 12, 2017

(51) Int. Cl.
| | |
|---|---|
| *B60R 22/26* | (2006.01) |
| *B60R 22/20* | (2006.01) |
| *B60R 22/195* | (2006.01) |
| *B60N 2/68* | (2006.01) |
| *B60R 22/18* | (2006.01) |

(52) U.S. Cl.
CPC ............. *B60R 22/20* (2013.01); *B60N 2/688* (2013.01); *B60R 22/1955* (2013.01); *B60R 22/26* (2013.01); *B60R 2022/1818* (2013.01)

(58) Field of Classification Search
CPC ............ B60R 22/1954; B60R 22/1955; B60R 22/1956; B60R 22/1958; B60R 22/20; B60R 22/26; B60N 2/809
See application file for complete search history.

(56) References Cited

U.S. PATENT DOCUMENTS

| | | | |
|---|---|---|---|
| 5,704,638 A * | 1/1998 | Lane, Jr. | B60R 21/207 |
| | | | 280/730.2 |
| 5,988,759 A | 11/1999 | Bauer et al. | |
| 6,145,881 A | 11/2000 | Miller, III et al. | |
| 6,336,664 B1 * | 1/2002 | Roder | B60R 22/1958 |
| | | | 280/806 |
| 6,474,691 B2 * | 11/2002 | Izume | B60R 22/20 |
| | | | 280/801.1 |
| 7,204,558 B2 * | 4/2007 | Tanaka | B60N 2/818 |
| | | | 297/410 |
| 7,584,990 B2 * | 9/2009 | Suyama | B60R 21/207 |
| | | | 280/730.2 |
| 8,303,042 B2 | 11/2012 | Kujawa et al. | |
| 2008/0061545 A1 * | 3/2008 | Holtz | B60R 22/1951 |
| | | | 280/808 |
| 2010/0084845 A1 * | 4/2010 | Pisaniello | B60R 22/023 |
| | | | 280/801.1 |
| 2016/0159317 A1 * | 6/2016 | Jung | B60R 22/1955 |
| | | | 297/472 |

FOREIGN PATENT DOCUMENTS

| | | |
|---|---|---|
| EP | 1923278 A1 | 5/2008 |
| JP | 2007210436 A | 8/2007 |
| KR | 101282527 B1 | 6/2013 |

* cited by examiner

*Primary Examiner* — Timothy J Brindley
(74) *Attorney, Agent, or Firm* — Frank A. MacKenzie; Bejin Bieneman PLC

(57) ABSTRACT

A seat includes a frame, a pyrotechnic actuator, a webbing guide, and a member. The pyrotechnic actuator includes a housing attached to the frame and a rod linearly movable relative to the housing from a retracted position to an extended position. The rod includes a slot. The webbing guide is attached to the rod. The member is supported by the frame and movable into the slot when the rod is in the extended position.

20 Claims, 9 Drawing Sheets

SEATBELT WEBBING GUIDE

BACKGROUND

Vehicles include seatbelts for each of the seats onboard. The seatbelt includes webbing that, when the seatbelt is buckled, stretches across an occupant of the seat. An anchor attaches one end of the webbing to a seat frame. The other end of the webbing feeds into a retractor, which includes a spool that pays out and retracts the webbing. A tongue slides freely along the webbing and, when engaged with a buckle, divides the webbing into a lap band and a shoulder band. The seatbelt is typically a three-point harness, meaning that the webbing is attached at three points around the occupant when fastened: the anchor, the retractor, and the buckle.

DETAILED DESCRIPTION

Figure 1:
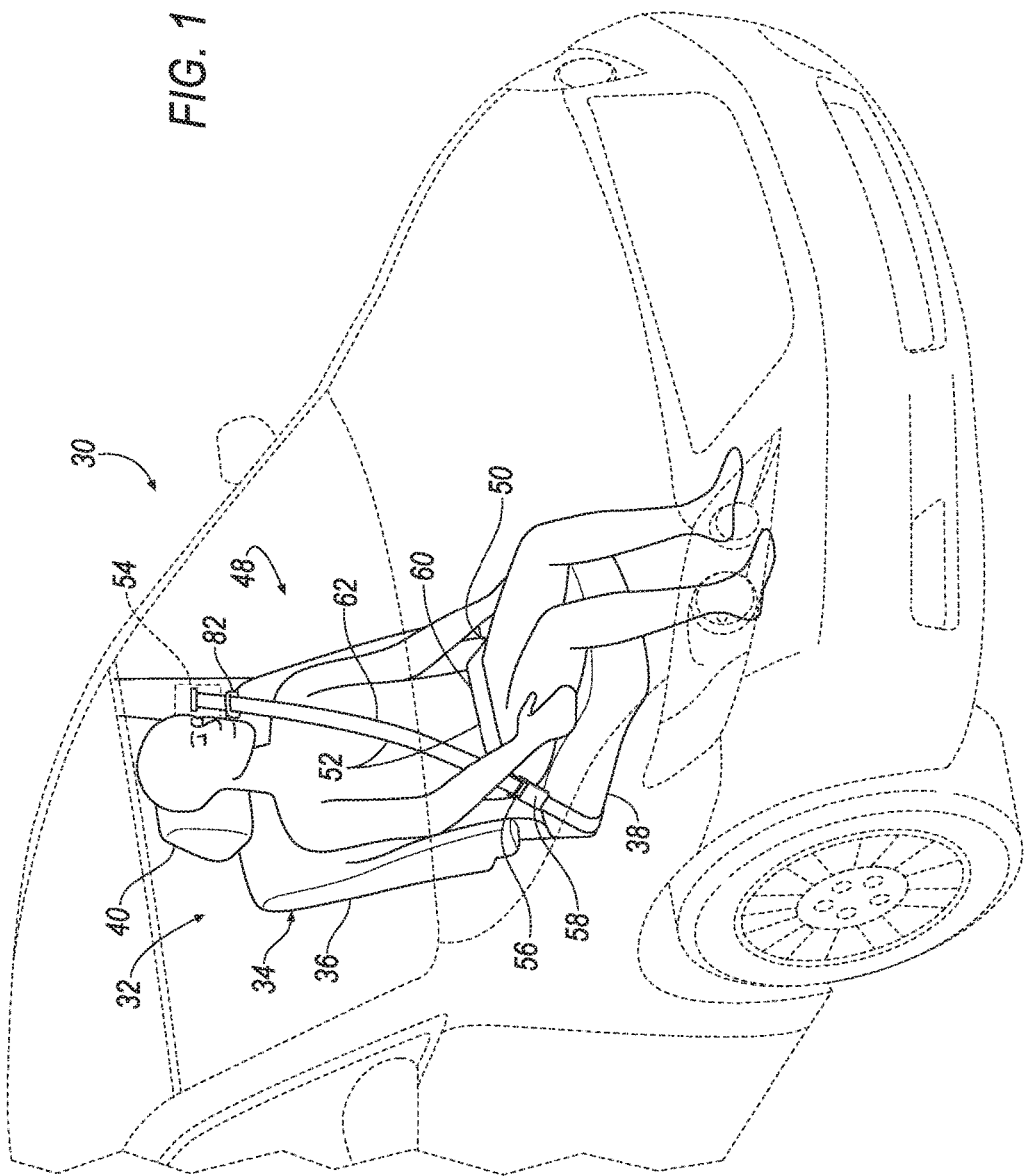
FIG. 1 is a perspective view of a vehicle including a seat.

A seat includes a frame, a pyrotechnic actuator including a housing attached to the frame and a rod linearly movable relative to the housing from a retracted position to an extended position, a webbing guide attached to the rod, and a member supported by the frame. The rod includes a slot. The member is movable into the slot when the rod is in the extended position.

The seat may include a spring attached to the member and to the frame. The spring may be in compression when the rod is in the retracted position.

The rod may be linearly movable relative to the housing in a vertical direction from the retracted position to the extended position.

The rod may be linearly movable relative to the housing in a vertical and inboard direction from the retracted position to the extended position.

The seat may include a seatback including the frame. The seatback may include a covering extending around the frame. The housing may be disposed inside the covering, and the webbing guide may be disposed outside the covering. The webbing guide may contact the covering when the rod is in the retracted position, and the webbing guide may be spaced from the covering when the rod is in the extended position.

The seat may include a computer in communication with the pyrotechnic actuator, and the computer may be programmed to instruct the pyrotechnic actuator to move the rod from the retracted position to the extended position in response to receiving data indicating an impact.

The seat may include a computer in communication with the pyrotechnic actuator, and the computer may be programmed to instruct the pyrotechnic actuator to move the rod from the retracted position to the extended position in response to receiving data indicating an oblique impact. The computer may be programmed to instruct the pyrotechnic actuator to maintain the rod in the retracted position in response to receiving data indicating a frontal impact.

A seat includes a frame, a pyrotechnic actuator including a housing attached to the frame and a rod linearly movable relative to the housing, a webbing guide attached to the rod, and a computer in communication with the pyrotechnic actuator. The computer is programmed to instruct the pyrotechnic actuator to move the rod from a retracted position to an extended position in response to receiving data indicating an oblique impact.

The computer may be programmed to instruct the pyrotechnic actuator to maintain the rod in the retracted position in response to receiving data indicating a frontal impact.

The rod may be linearly movable relative to the housing in a vertical direction from the retracted position to the extended position.

A webbing guide 82 is positioned to move a shoulder band 62 upward in response to an impact to a vehicle 30. The raised position of the shoulder band 62 may move the shoulder band 62 to a more centered position on a chest of the occupant, which may reduce a likelihood that the shoulder band 62 slips off the shoulder of the occupant during some impact scenarios, such as oblique impacts. The raised position of the shoulder band 62 may also introduce a certain amount of slack into the shoulder band 62, which may reduce pressure on, e.g., the chest of an occupant.

With reference to FIG. 1, the vehicle 30 includes a passenger cabin 32 to house occupants, if any, of the vehicle 30. The passenger cabin 32 includes a plurality of seats 34, such as one or more front seats 34 disposed at a front of the passenger cabin 32 and one or more back seats 34 disposed behind the front seats 34. The passenger cabin 32 may also include third-row seats 34 at a rear of the passenger cabin 32. In FIG. 1, the seat 34 is shown to be a bucket seat, but the seats 34 may be other or multiple different types. The position and orientation of the seats 34 and components thereof may be adjustable by an occupant.

Figure 2:
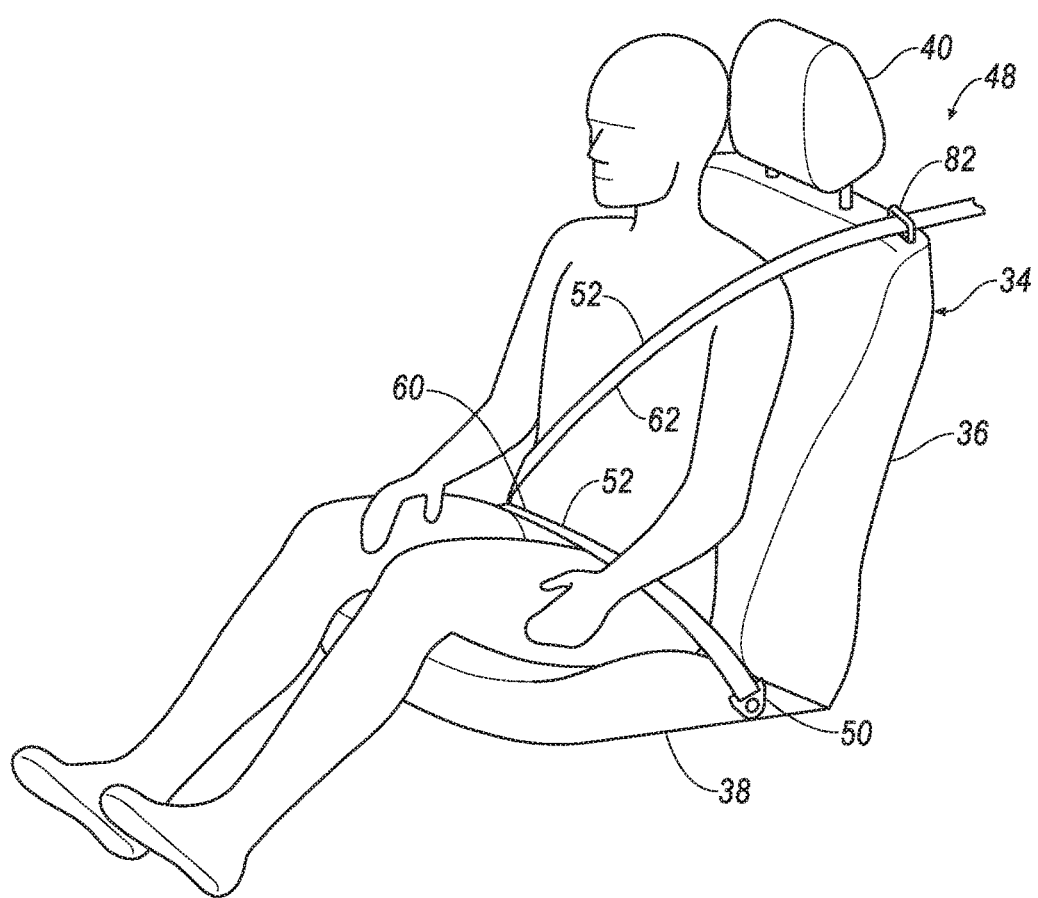
FIG. 2 is a perspective view of the seat.
Figure 3:
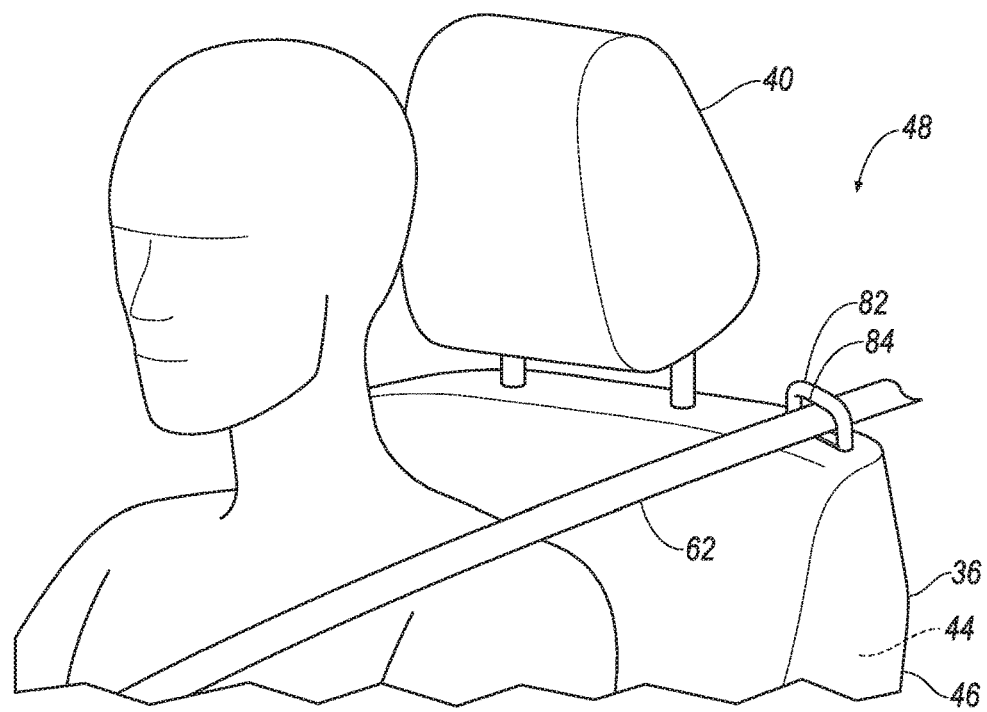
FIG. 3 is a perspective view of a portion of the seat with a webbing guide in a retracted position.

With reference to FIG. 2, the seat 34 may include a seatback 36, a seat bottom 38, and a headrest 40. The headrest 40 may be supported by the seatback 36 and may be stationary or movable relative to the seatback 36. The seatback 36 may be supported by the seat bottom 38 and may be stationary or movable relative to the seat bottom 38. The seatback 36, the seat bottom 38, and/or the headrest 40 may be adjustable in multiple degrees of freedom. Specifically, the seatback 36, the seat bottom 38, and/or the headrest 40 may themselves be adjustable, in other words, adjustable components within the seatback 36, the seat bottom 38, and/or the headrest 40, and/or may be adjustable relative to each other.

Figure 5:
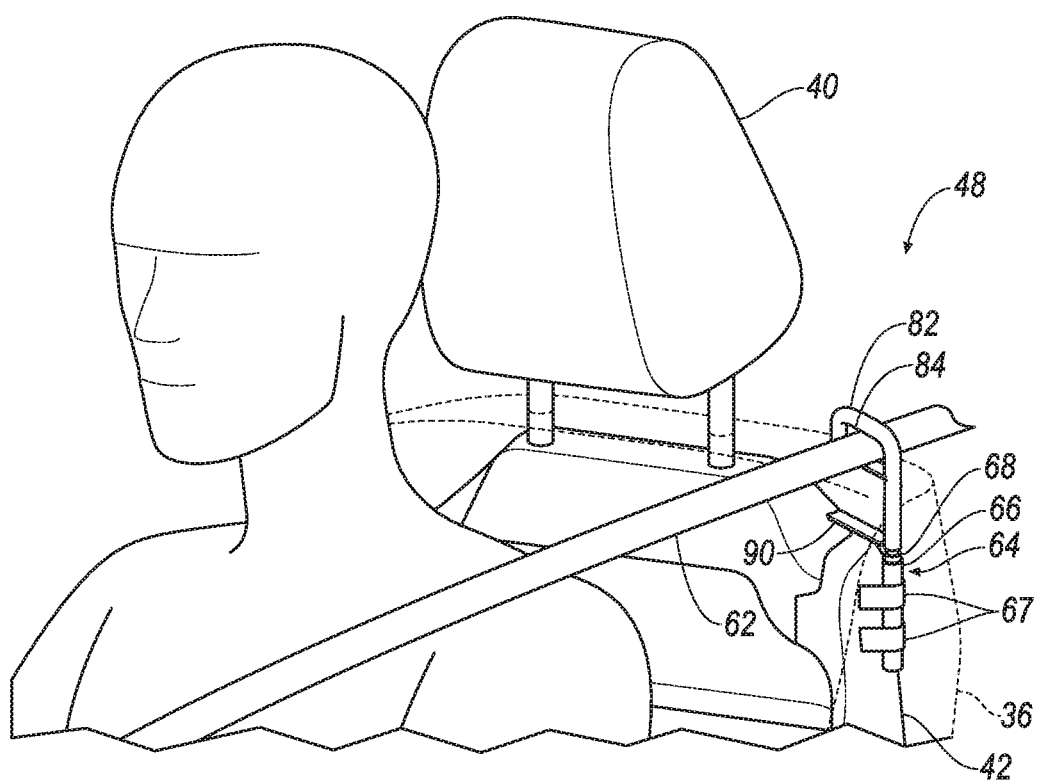
FIG. 5 is a perspective view of the portion of the seat with the webbing guide in the retracted position.

With reference to FIG. 5, the seatback 36 includes a frame 42. The frame 42 may include panels and/or may include tubes, beams, etc. The frame 42 may be formed of any suitable plastic material, e.g., carbon fiber reinforced plastic (CFRP), glass fiber-reinforced semi-finished thermoplastic composite (organosheet), etc. Alternatively, for example, some or all components of the frame 42 may be formed of a suitable metal, e.g., steel or aluminum.

With reference to FIGS. 2-5, a cushion 44 is supported on the frame 42. The cushion 44 may be made of cushioning material and covered with a covering 46. The cushion 44 may be formed of foam or any other suitable supportive material. The covering 46 may be formed of cloth, leather, faux leather, or any other suitable material. The covering 46 extends around the cushion 44 and the frame 42. The covering 46 may be stitched in panels around the cushion 44 and the frame 42.

With reference to FIG. 2, the seat 34 includes a restraint system 48. An anchor 50 fixes one end of a webbing 52 relative to the frame 42. The other end of the webbing 52 feeds into a retractor 54, which may include a spool (not shown) that extends and retracts the webbing 52. A tongue 56 slides freely along the webbing 52 and, when engaged with a buckle 58, divides the webbing 52 into a lap band 60 and a shoulder band 62. The restraint system 48 is a three-point harness, meaning that the webbing 52 is attached at three points around the occupant when fastened: the anchor 50, the retractor 54, and the buckle 58. The restraint system 48 may, alternatively, include another arrangement of attachment points.

With reference to FIGS. 5-9, a pyrotechnic actuator 64 is attached to the frame 42. The pyrotechnic actuator 64 includes a housing 66, a rod 68, and a charge 70. The housing 66 may be cylindrical and hollow and may be elongated between a closed end 72 and an open end 74. The rod 68 may be cylindrical and may be elongated from a lower end 76 to an upper end 78. The rod 68 may extend through the open end 74 of the housing 66. The lower end 76 of the rod 68 may be disposed inside the housing 66, and the upper end 78 may be disposed outside the housing 66. The housing 66 and the lower end 76 of the rod 68 may define and enclose a chamber 80. The charge 70 may be disposed in the chamber 80.

The housing 66 is attached to the frame 42. The housing 66 is fixed relative to the frame 42. The housing 66 may be attached via clips 57, as shown in FIGS. 5-9, or via any other suitable attachment, e.g., fasteners, adhesive, welding, etc. The housing 66 is disposed inside the covering 46, i.e., the covering 46 encloses a volume including the housing 66. The housing 66 may be disposed between the cushion 44 and the frame 42.

Figure 4:
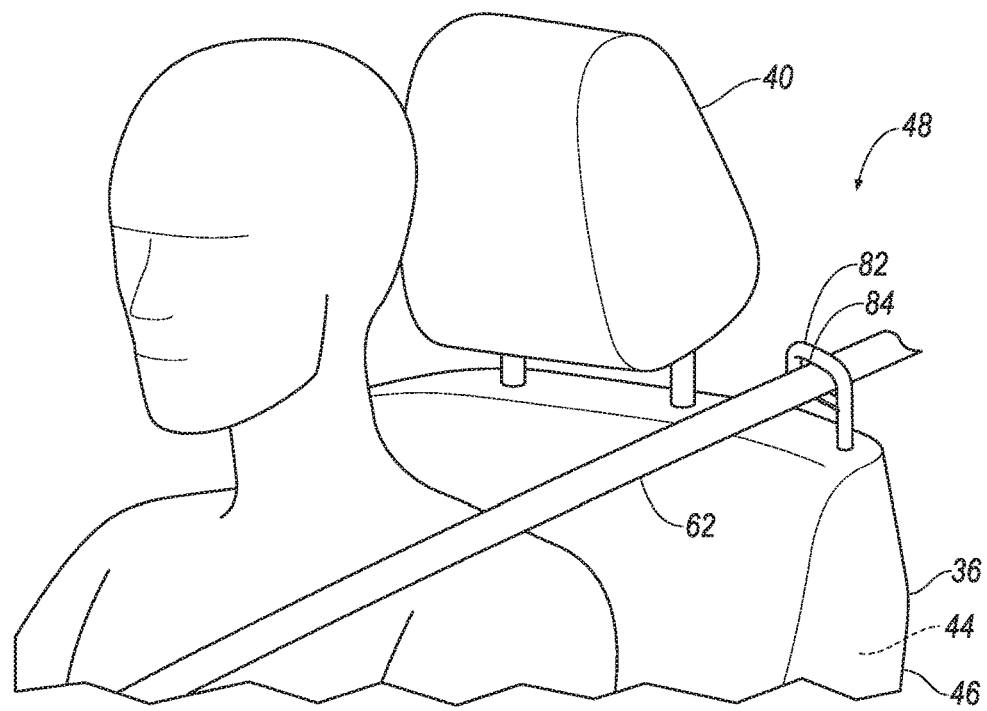
FIG. 4 is a perspective view of the portion of the seat with the webbing guide in an extended position.
Figure 6:
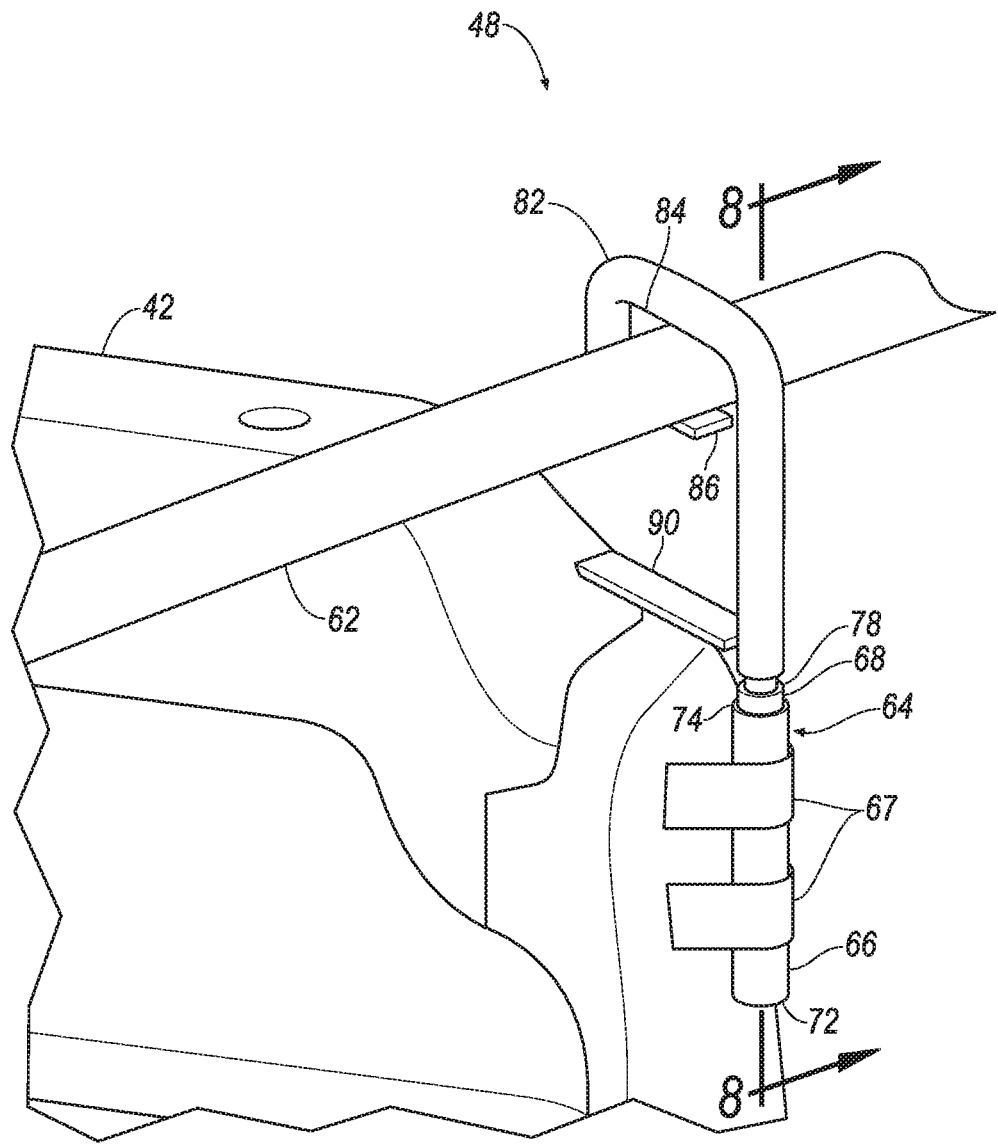
FIG. 6 is a perspective view of a portion of a frame of the seat with the webbing guide in the retracted position.
Figure 7:
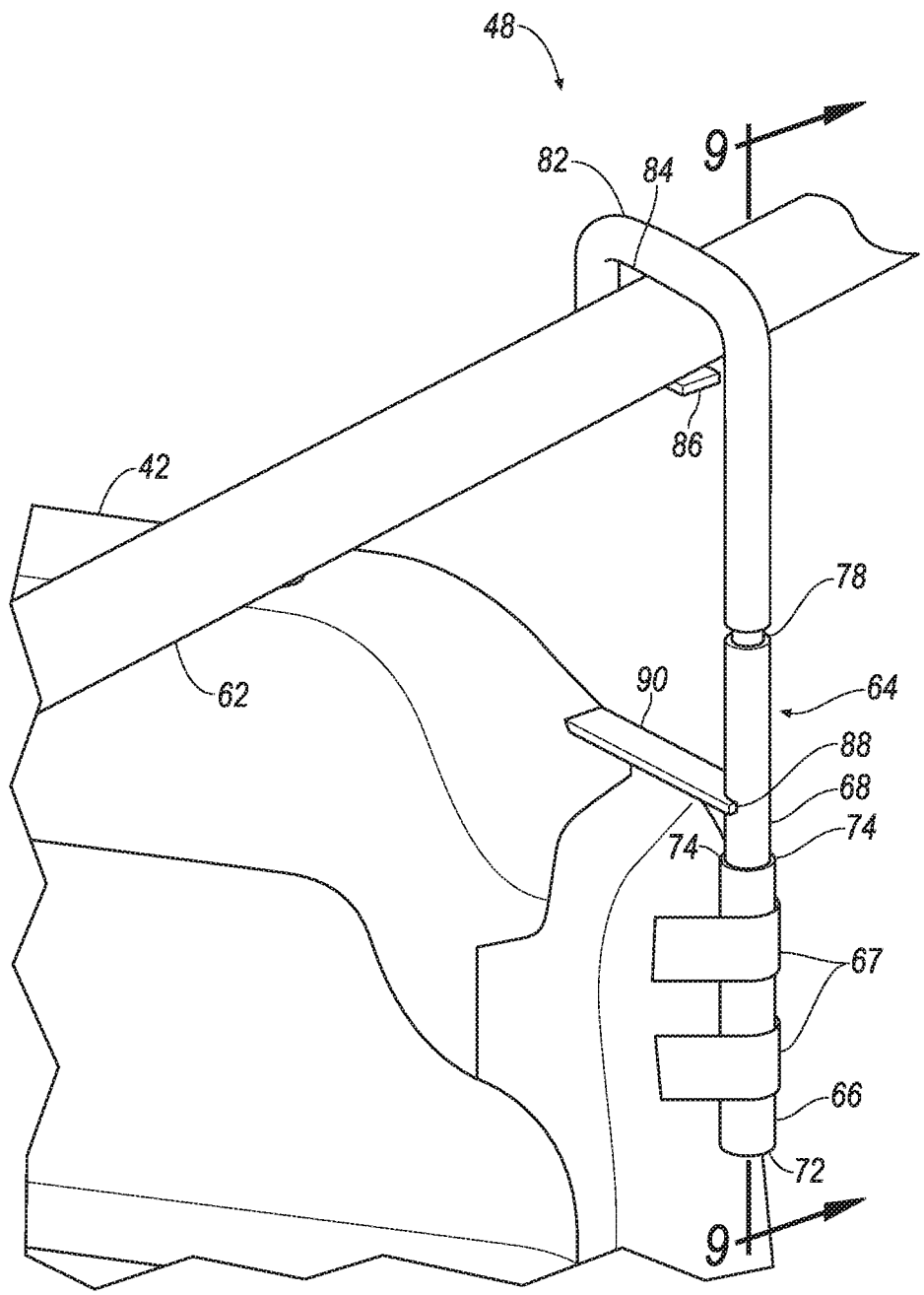
FIG. 7 is a perspective view of the portion of the frame with the webbing guide in the extended position.
Figure 8:
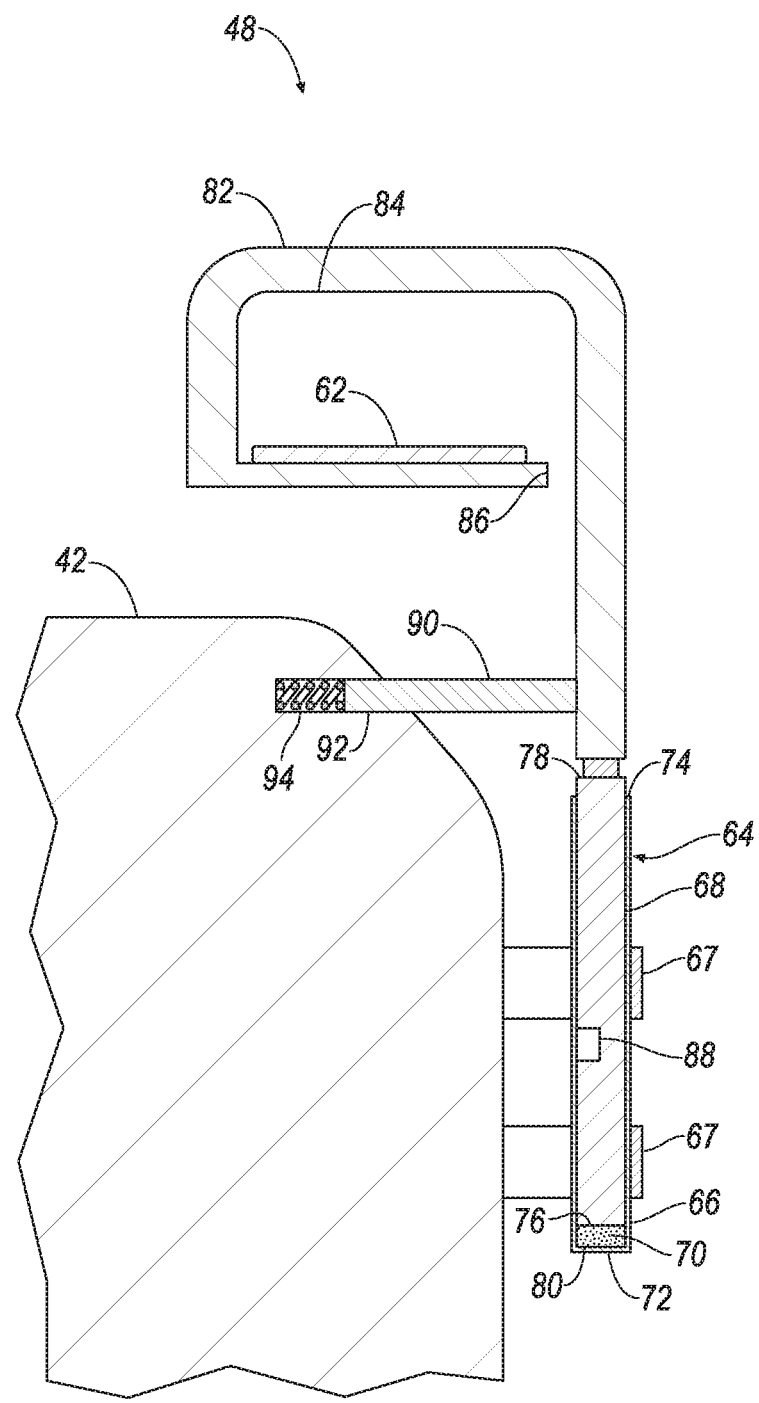
FIG. 8 is a cross-sectional front view of a pyrotechnic actuator of the seat in a retracted position.
Figure 9:
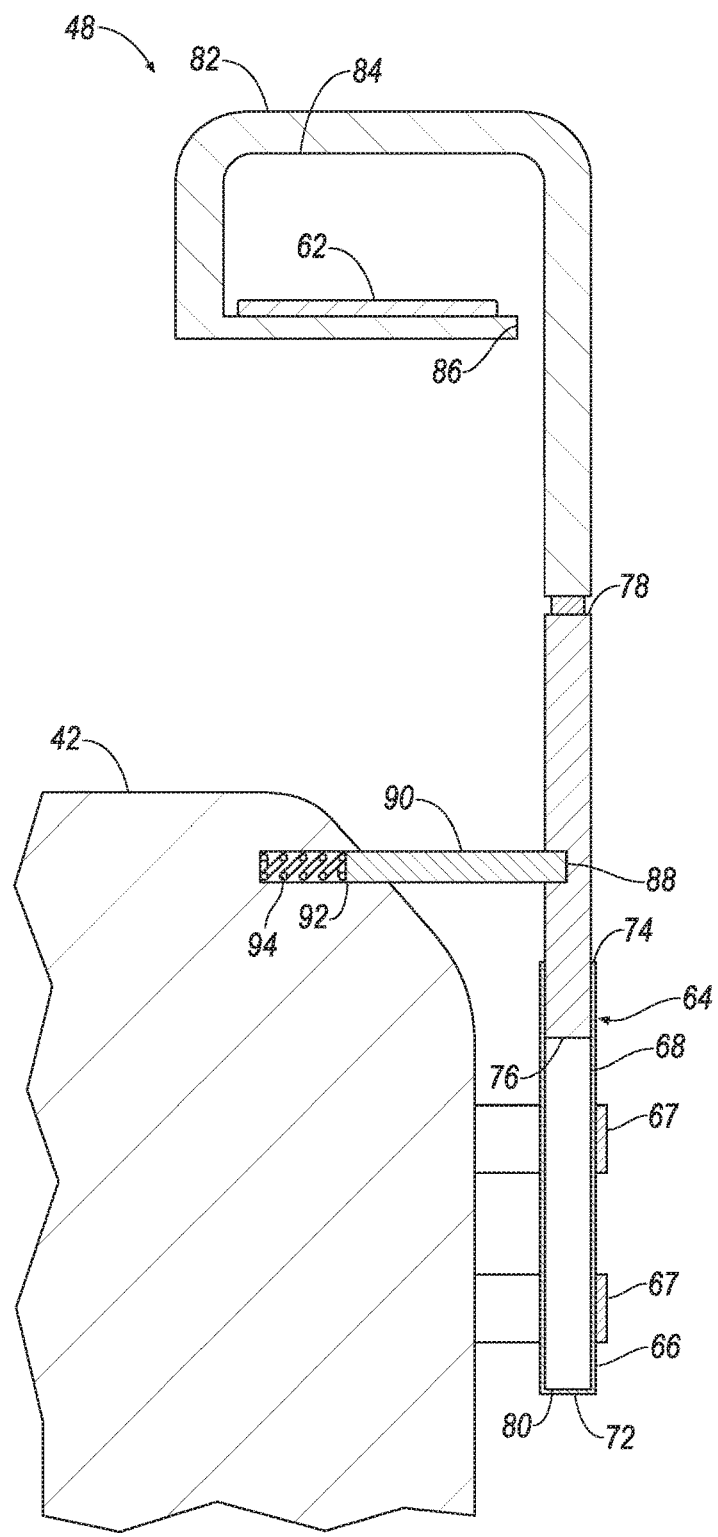
FIG. 9 is a cross-sectional front view of the pyrotechnic actuator of the seat in an extended position.

The rod 68 is linearly movable relative to the housing 66 from a retracted position, as shown in FIGS. 3, 5, 6, and 8, to an extended position, as shown in FIGS. 4, 7, and 9. The rod 68 may be linearly movable in a vertical direction or in a vertical and inboard direction. "Inboard," for the purposes of this disclosure, means toward a center line of the seat 34 defined by a direction the seat 34 is facing. In the extended position, more of the rod 68 extends outside of the housing 66 than in the retracted position.

With reference to FIG. 8, the charge 70 may be combustible to produce a gas. The charge 70 may be formed of a solid mixture of substances that, when ignited, react to produce the gas. For example, the charge 70 may be formed of sodium azide ($NaNO_3$), potassium nitrate ($KNO_3$), and silicon dioxide ($SiO_2$), which react to form nitrogen gas ($N_2$). When the charge 70 combusts, the gas expands in the chamber 80 and exerts pressure on the lower end 76 of the rod 68. The pressure on the lower end 76 of the rod 68 pushes the rod 68 from the retracted position to the extended position.

With reference to FIGS. 2-9, the webbing guide 82 is attached to the rod 68, specifically, to the upper end 78 of the rod 68. The webbing guide 82 is fixed relative to the rod 68. The webbing guide 82 is disposed above the housing 66 and outside the covering 46. When the rod 68 is in the retracted position, the webbing guide 82 may contact the covering 46. When the rod 68 is in the extended position, the webbing guide 82 is spaced from the covering 46.

The webbing 52 extends through the webbing guide 82. The webbing guide 82 may have a loop shape defining an opening 84 through which the webbing 52 extends. The opening 84 may be sized to allow a cross-sectional shape of the webbing 52 to freely pass through. The loop shape of the webbing guide 82 may be open or closed; i.e., the loop shape of the webbing guide 82 may form a complete circuit or may have a gap 86. The gap 86 may be sized to permit a thickness of the webbing 52 to pass through.

With reference to FIGS. 7-9, the rod 68 includes a slot 88. The slot 88 may be spaced from the lower end 76 and from the upper end 78 of the rod 68. The slot 88 may extend toward a central axis of the rod 68. The slot 88 may extend perpendicular or generally perpendicular to a direction of motion of the rod 68.

With reference to FIGS. 6-9, a member 90 may be supported by the frame 42. The member 90 may be sized to fit in the slot 88. The member 90 may be positioned in a bore 92 in the frame 42. The member 90 may be elongated in a generally lateral direction that is generally perpendicular to the direction of elongation and/or movement of the rod 68. The bore 92 may be elongated in the same generally lateral direction.

The member 90 may be movable in the bore 92 from a disengaged position, as shown in FIGS. 6 and 8, to an engaged position, as shown in FIGS. 7 and 9. The member 90 extends farther from the bore 92 in the engaged position than in the disengaged position. The member 90 is in the disengaged position when the rod 68 is in the retracted position. The member 90 in the engaged position extends into the slot 88. The member 90 is movable into the slot 88 when the rod 68 is in the extended position. In other words, when the rod 68 is in the extended position, the slot 88 is positioned in the direction of movement of the member 90, and the member 90 is able to move from the disengaged position to the engaged position.

With reference to FIGS. 8 and 9, a spring 94 may be attached to the member 90 and to the frame 42. The spring 94 may be a compression spring. The spring 94 may be in compression when the member 90 is in the disengaged position, i.e., when the rod 68 is in the retracted position. The spring 94 may be relaxed or under less compression when the member 90 is in the engaged position, i.e., when the rod 68 is in the extended position.

Figure 10:
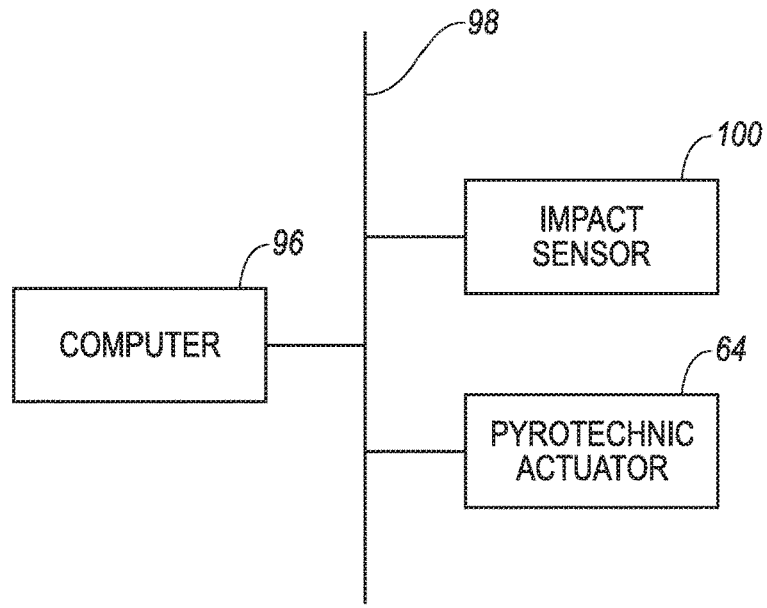
FIG. 10 is a block diagram of a control system of the seat.

With reference to FIG. 10, a computer 96 is a microprocessor-based controller. The computer 96 may include a processor, memory, etc. The memory of the computer 96 may include memory for storing instructions executable by the processor as well as for electronically storing data and/or databases. The computer 96 may be, e.g., a restraint control module, which may be in communication with and may control airbags, pretensioners for the restraint system 48, etc., among other functions.

The computer 96 may transmit and receive data through a communications network 98 such as a controller area network (CAN) bus, Ethernet, WiFi, Local Interconnect Network (LIN), onboard diagnostics connector (OBD-II), and/or by any other wired or wireless communications network. The computer 96 may be in communication with an impact sensor 100, the pyrotechnic actuator 64, and other components via the communications network 98.

The impact sensor 100 is adapted to detect an impact to the vehicle 30. The impact sensor 100 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more cameras, CCD image sensors, CMOS image sensors, etc. The impact sensor 100 may be located at numerous points in or on the vehicle 30.

Figure 11:
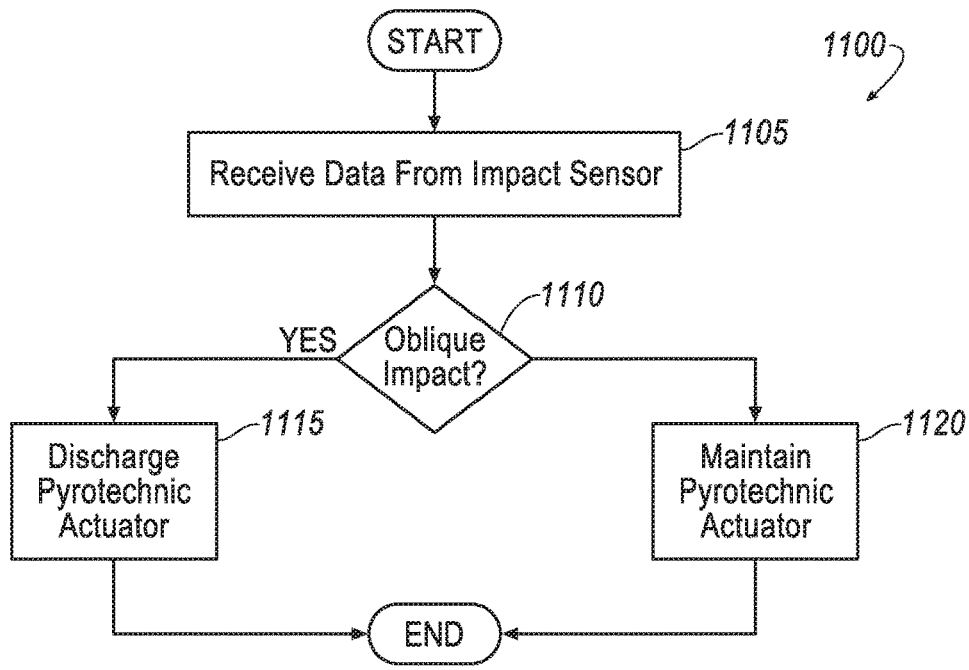
FIG. 11 is a process flow diagram of a process for moving the webbing guide.

FIG. 11 is a process flow diagram illustrating an exemplary process 1100 for moving the webbing guide 82. The memory of the computer 96 stores executable instructions for performing the steps of the process 1100.

The process 1100 begins in a block 1105, in which the computer 96 receives data from the impact sensor 100 via the communications network 98. The data may be a signal from the impact sensor 100 and may include severity and/or direction of an impact to the vehicle 30.

Next, in a decision block 1110, the computer 96 determines whether the data received from the impact sensor 100 indicates that an oblique impact has occurred. An oblique impact is an impact to the vehicle 30 in which the impactor is off the centerline of the vehicle 30. If an oblique impact has not occurred, i.e., if no impact has occurred or if a frontal impact has occurred, the process 1100 proceeds to a block 1120.

If an oblique impact has occurred, next, in a block 1115, the computer 96 instructs the pyrotechnic actuator 64 to move the rod 68 from the retracted position to the extended position. Specifically, the computer 96 instructs the charge 70 to combust, and the pressure from the gas created by combustion pushes the rod 68 from the retracted position to the extended position. The webbing guide 82 moves upward with the rod 68, and the webbing guide 82 pulls the shoulder band 62 upward. The shoulder band 62 moves to a more centered position on a chest of the occupant, which may reduce a likelihood that the shoulder band 62 slips off the shoulder of the occupant during some oblique impacts. The raised position of the shoulder band 62 may introduce a certain amount of slack into the shoulder band 62, which may reduce pressure on, e.g., a chest of an occupant. Once the rod 68 is in the extended position, the spring 94 pushes the member 90 into the slot 88. By engaging the slot 88, the member 90 prevents the rod 68 and thus the webbing guide 82 from moving further upward and from recoiling downward. After the block 1115, the process 1100 ends.

After the decision block 1110, if an oblique impact has not occurred, the computer 96 instructs the pyrotechnic actuator 64 to maintain the rod 68 in the retracted position, i.e., to not combust the charge 70. The shoulder band 62 remains in the same position on the chest of the occupant. After the block 1120, the process 1100 ends.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seat comprising:
   a frame;
   a pyrotechnic actuator including a charge, a housing attached to the frame, and a rod linearly movable relative to the housing from a retracted position to an extended position, the rod including a slot;
   a webbing guide attached to the rod; and
   a member supported by the frame and movable into the slot when the rod is in the extended position.

2. The seat of claim 1, further comprising a spring attached to the member and to the frame.

3. The seat of claim 2, wherein the spring is in compression when the rod is in the retracted position.

4. The seat of claim 1, wherein the rod is linearly movable relative to the housing in a vertical direction from the retracted position to the extended position.

5. The seat of claim 1, wherein the rod is linearly movable relative to the housing in a vertical and inboard direction from the retracted position to the extended position.

6. The seat of claim 1, further comprising a seatback including the frame.

7. The seat of claim 6, wherein the seatback includes a covering extending around the frame.

8. The seat of claim 7, wherein the housing is disposed inside the covering, and the webbing guide is disposed outside the covering.

9. The seat of claim 7, wherein the webbing guide contacts the covering when the rod is in the retracted position, and the webbing guide is spaced from the covering when the rod is in the extended position.

10. The seat of claim 1, further comprising a computer in communication with the pyrotechnic actuator, wherein the computer is programmed to instruct the pyrotechnic actuator to move the rod from the retracted position to the extended position in response to receiving data indicating an impact.

11. The seat of claim 1, further comprising a computer in communication with the pyrotechnic actuator, wherein the computer is programmed to instruct the pyrotechnic actuator to move the rod from the retracted position to the extended position in response to receiving data indicating an oblique impact.

12. The seat of claim 11, wherein the computer is programmed to instruct the pyrotechnic actuator to maintain the rod in the retracted position in response to receiving data indicating a frontal impact.

13. A seat comprising:
    a frame;
    a pyrotechnic actuator including a charge, a housing attached to the frame, and a rod linearly movable relative to the housing;
    a webbing guide attached to the rod; and
    a computer in communication with the pyrotechnic actuator, the computer programmed to instruct the pyrotechnic actuator to move the rod from a retracted position to an extended position in response to receiving data indicating an oblique impact, and to instruct the pyrotechnic actuator to maintain the rod in the retracted position in response to receiving data indicating a frontal impact.

14. The seat of claim 1, further comprising a clip attaching the housing to the frame.

15. The seat of claim 1, wherein the housing is attached to an exterior of the frame.

16. The seat of claim 15, wherein the housing is spaced from the frame.

17. The seat of claim 15, further comprising a covering, wherein the housing is disposed inside the covering.

18. The seat of claim 15, further comprising a clip attaching the housing to the frame.

19. The seat of claim 1, further comprising a bore in the frame, the member being disposed in the bore, and a spring in the bore between the frame and the member.

20. The seat of claim 13, wherein the rod is linearly movable relative to the housing in a vertical direction from the retracted position to the extended position.

* * * * *